United States Patent [19]

Kappers et al.

[11] Patent Number: 5,653,064
[45] Date of Patent: Aug. 5, 1997

[54] HEAD WALL FOR HOSPITAL BED

[75] Inventors: Timothy A. Kappers, Cincinnati, Ohio; Steven R. Westerfield, Batesville, Ind.; Dennis J. Gallant, Harrison, Ohio

[73] Assignee: Hill-Rom Company, Inc., Batesville, Ind.

[21] Appl. No.: 236,394

[22] Filed: May 2, 1994

Related U.S. Application Data

[63] Continuation of Ser. No. 42,462, Apr. 5, 1993, Pat. No. 5,323,565, which is a continuation of Ser. No. 678,189, Mar. 29, 1991, abandoned, which is a continuation of Ser. No. 443,432, Nov. 30, 1989, abandoned, which is a continuation of Ser. No. 267,887, Nov. 4, 1988, abandoned, which is a continuation of Ser. No. 208,380, Jun. 17, 1988, Pat. No. 4,821,470.

[51] Int. Cl.$^6$ .............................. H02G 3/10; E06B 9/15
[52] U.S. Cl. .................. 52/36.4; 52/220.1; 312/209; 312/297
[58] Field of Search ................ 52/36.4, 28, 220.1, 52/27, 36.2, 36.1, 36.5, 220.5, 220.7, 220.8; 174/48, 49; 312/209, 297, 223.1, 223.5, 223.6

[56] References Cited

U.S. PATENT DOCUMENTS

| | | |
|---|---|---|
| 971,751 | 10/1910 | Hoyt. |
| 1,263,683 | 4/1918 | Laursen. |
| 2,076,650 | 4/1937 | Kettron. |
| 2,157,264 | 5/1939 | Kirby, Jr.. |
| 2,853,354 | 9/1958 | Miller et al.. |
| 3,200,244 | 8/1965 | Meyer. |
| 3,389,246 | 6/1968 | Shemitz. |
| 3,461,349 | 8/1969 | Meyer. |
| 3,462,892 | 8/1969 | Meyer. |
| 3,567,842 | 3/1971 | Meyer. |
| 3,660,591 | 5/1972 | Schultz et al.. |
| 3,692,920 | 9/1972 | Santarelli. |
| 3,762,398 | 10/1973 | Schefke et al.. |
| 3,769,502 | 10/1973 | Schultz et al.. |
| 3,919,540 | 11/1975 | Burst et al.. |
| 3,921,345 | 11/1975 | Damico. |
| 4,177,612 | 12/1979 | Tochihara. |
| 4,217,009 | 8/1980 | Suter. |
| 4,338,485 | 7/1982 | Fullenkamp et al.. |
| 4,354,330 | 10/1982 | Schwartz. |
| 4,416,097 | 11/1983 | Weir. |
| 4,452,499 | 6/1984 | Verburg. |
| 4,475,322 | 10/1984 | Russo et al.. |
| 4,646,211 | 2/1987 | Gallant et al.. |
| 4,753,055 | 6/1988 | Durham, Jr.. |

OTHER PUBLICATIONS

Modular Medical Wall Series 3000, Square D Company, Brochure 22 pages (1979).
Hill–Rom Flatwall, 1981, Brochure.

*Primary Examiner*—Michael Safavi

[57] ABSTRACT

A clutter-eliminating head wall for a hospital bed has two horizontally-spaced modules with services and service outlets mounted in the modules. The recess between the modules is covered by a removable panel. The modules are covered by sliding tambour doors that slide behind the center panel to provide access to the modules.

3 Claims, 3 Drawing Sheets

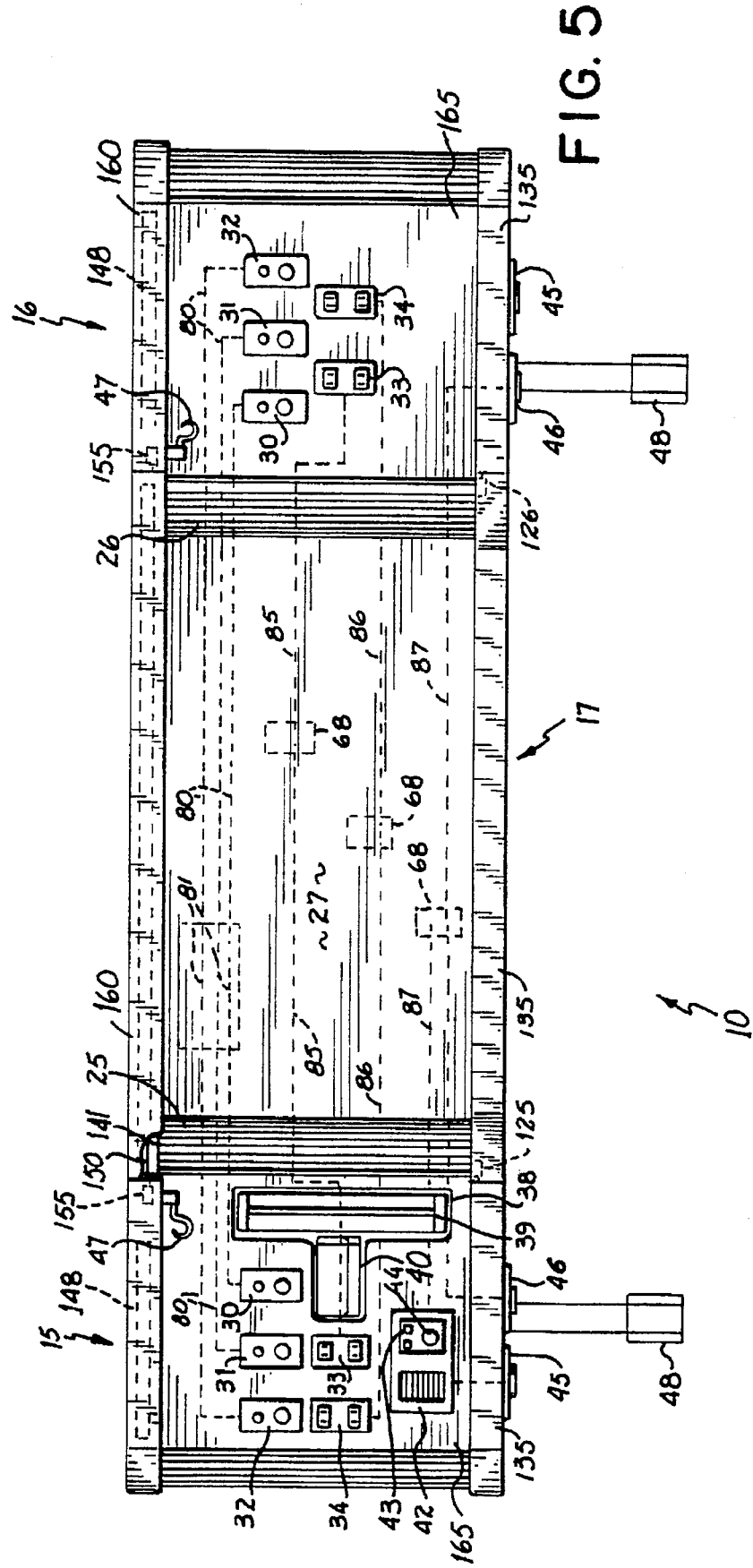

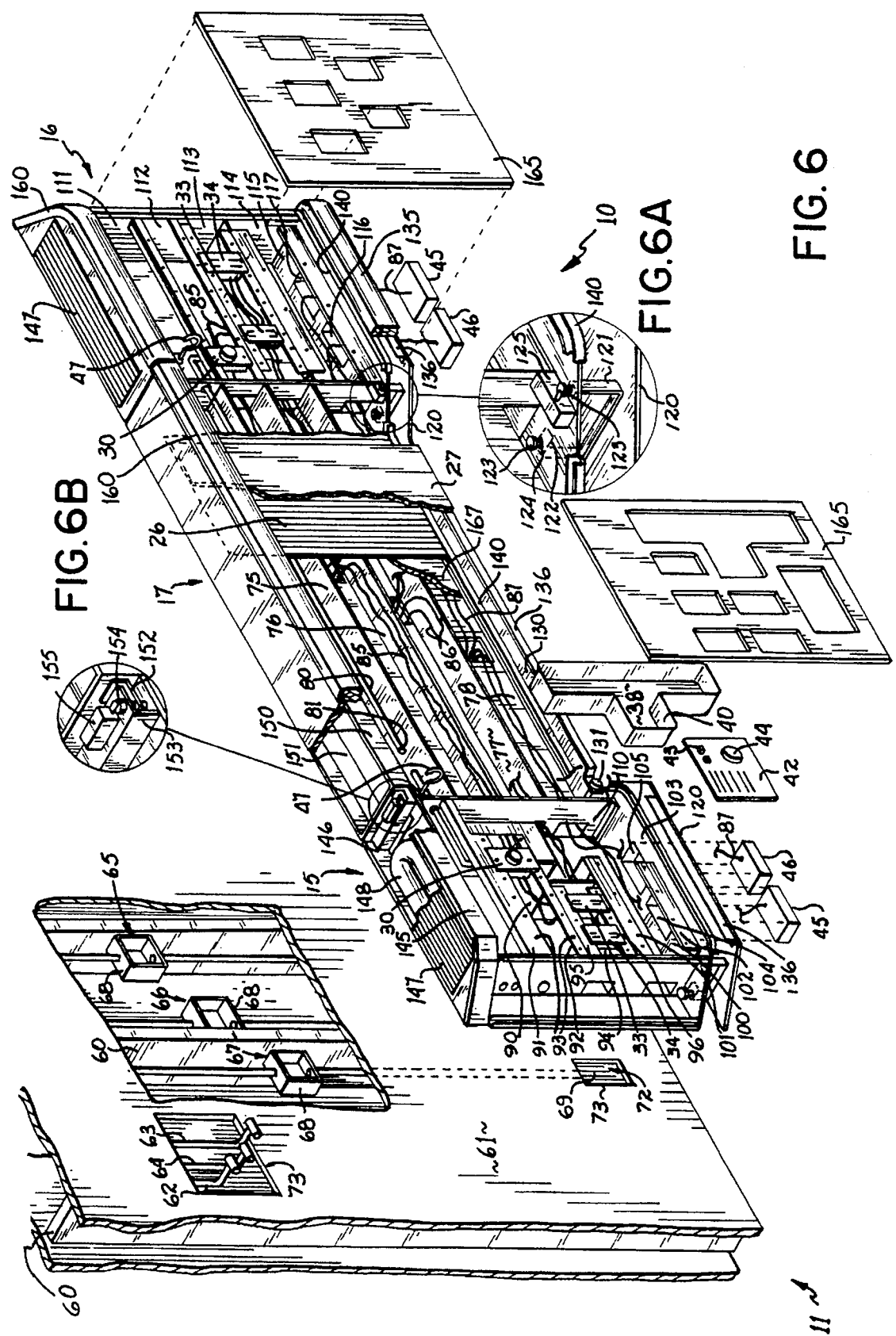

HEAD WALL FOR HOSPITAL BED

This is a continuation of application Ser. No. 08/042,462 filed Apr. 5, 1993, which is a file wrapper continuation of application Ser. No. 07/678,189 filed Mar. 29, 1991, now abandoned which is a file wrapper continuation of application Ser. No. 07/443,432 filed Nov. 30, 1989, now abandoned which is a continuation of application Ser. No. 07/267,387 filed Nov. 4, 1988, now abandoned which is a continuation of application Ser. No. 07/208,380 filed Jun. 17, 1988 now U.S. Pat. No. 4,821,470.

This invention relates to a head wall for the providing of gas and electrical assistance as well as other services to a hospital room adjacent a patient's bed. The invention relates particularly to providing such services in rooms intended for patients with low to medium medical acuity.

Efforts have been made to improve the aesthetics of the hospital room normally employed with patients with low to medium medical acuity. Rooms such as medical/surgical hospital rooms, birthing rooms, VIP suites and the like are so employed. The aesthetics of the critical care rooms is not so important, for there the patients usually do not have an awareness of their surroundings. Notwithstanding efforts to improve the aesthetics of hospital rooms, even the best of hospital rooms look clinical with the service outlets and other facilities accessible all around the bed. These elements have to be accessible and there has not been a good way of concealing them while still providing their ready accessibility.

There has been considerable recognition of the fact that the mental attitude of a patient significantly affects the speed of a patient's recovery. To place a patient in a room that, to a patient's eyes, looks sterile and threatening has a demoralizing effect on the patient and is thus detrimental to the curing process. On the other hand, if the patient is brought to a room that has the pleasant appearance of a hotel room with no apparent medical service equipment exposed, a patient is more likely to be impressed with the fact that the patient is really well, thereby creating a mental attitude conducive to recovery.

So, for a variety of reasons, it is desired to conceal or at least make unobtrusive the services and service connections that necessarily must go into a medical/surgical room. Such services and service connections, include:

1. Locations for medical gases—three on each side of the bed.
2. Standard and emergency electrical outlets.
3. The location for a nurse call.
4. An aneroid or mercury blood pressure gas with built-in cuff storage.
5. Built-in IV hook for each side of the bed.
6. Built-in swing-out bottle slide for each side of the bed.
7. Indirect lighting for the room.
8. A reading light with a safety bed kill switching feature.
9. Remote switch for nurse call cancel button.

An objective of the present invention has been to provide cabinetry at the head of the bed, termed the "head wall," to provide service facilities and service connections, but to conceal them when not required.

Another objective of the present invention has been to provide cabinetry for concealing such service and service connections wherein the cabinet does not provide an obstruction to a rising bed that is mounted close to the wall.

Still another objective of the present invention has been to provide the cabinetry referred to above in concert with a bed locator that is located adjacent the floor, the bed locator itself having certain service connections.

These objectives of the present invention are attained by providing a cabinet installed on the wall of the room at the head of the bed. The cabinet has a length substantially greater than its height. The cabinet includes two horizontally-spaced modules that are positioned about 48 inches apart. The modules protrude significantly from the wall and, between them, create a recess immediately above the bed through which the bed can pass when it is elevated.

The area of the recess is covered by a movable panel, the removable panel providing access to wiring and gas raceways by which the services are brought into the patient's room to their termination points in the modules. Preferably, the panel will be hinged to swing vertically or horizontally. Further, it is preferable that the panel is in the form of a picture frame permitting the artwork to be selected appropriate for the room decor.

The modules contain the services and service connections. These include gas outlets on either side, standard electrical 110 V outlets, emergency electrical outlets, blood pressure monitoring accessories, and a low voltage service for a nurse call unit and accessories for the nurse call. All of the foregoing services and service terminations are covered by tambour doors mounted in slides that permit the doors to slide behind the removable panel when the tambour doors are open to expose the service and service connections.

Horizontal upper and lower moldings are preferably provided across the head wall.

The modules also provide support for indirect lighting above the modules. A safety reading light is mounted behind the upper molding across the recess at the upper edge of the cabinet. The reading light could be in the path of an IV pole or traction equipment mounted at the head end of the bed, but the light is upwardly-movable and is provided with a limit switch adapted to cut off power to the bed when the bed is being raised as disclosed in U.S. Pat. No. 3,919,540. The lower molding can be upwardly-movable and connected by a limit switch to the bed power outlet. Indirect lighting, supported on the modules and behind the molding, is also provided.

The invention further provides a bed locator or dock consisting of two protuberances or bumpers between which the bed is positioned when the bed is brought into position adjacent the wall. The locator bumpers are positioned directly below respective modules so that when the bed is correctly positioned between the bumpers, the bed is centered below the recess between the modules. The protuberances forming the bed locator are provided with certain of the outlets and other terminations, including the power for the bed. Thus, the chase bringing the services to the modules, when extended downwardly, brings such services as are required to the protuberances of the bed locator.

The bed locator with its service connections enhances the flexibility of the whole system. For example, a power outlet for the bed is located in the bumper and the safety light limit switch is connected directly to it. Another example is the nurse call cord. The system of the invention could have three jacks for the cord, one within a module, one behind the lower molding on a module and one on a bumper.

The several features and objectives of the present invention will become more readily apparent from the following detailed description taken in conjunction with the accompanying drawings in which.

FIG. 5 an elevational view of the head wall with the doors open; and

Figure 1:
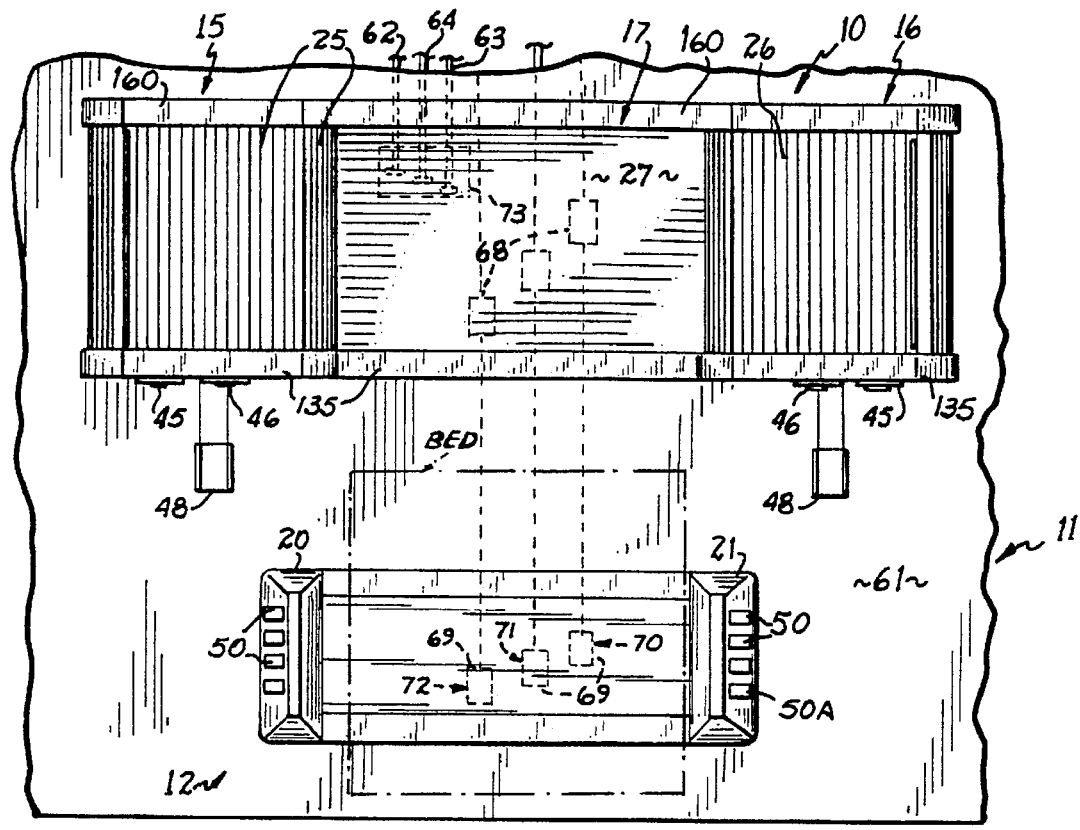
FIG. 1 is an elevational view of a room wall containing the head wall and bed locator.

FIG. 6 is a disassembled, perspective view of the structure of FIG. 1.

FIG. 6A shows an enlarged, detailed view of a lower horizontal plate arrangement attached to a bottom wall of a head wall module.

FIG. 6B shows an enlarged, detailed view of the attachment between a lighting fixture and a head wall module.

Referring to FIG. 1, a head wall 10 is shown mounted on a room wall 11. It has a length about three times greater than its height and is mounted above a bed in the room. A bed locator 12 is located below the head wall. The head wall is formed by two modules 15 and 16 of substantially identical size that are spaced apart by a recessed center section 17. The length of the center section that spaces the two modules apart is about four feet. The head wall is mounted well above the hospital room floor to permit a bed to be positioned below it.

Below the head wall, the bed locator 12 is formed by two bumpers 20, 21 that are also spaced apart by about four feet. The bumpers preferably have a vertical dimension of approximately twenty inches so that they are adapted to receive and center the bed adjacent the wall regardless of whether the bed is in a raised or lowered position.

Figure 2:
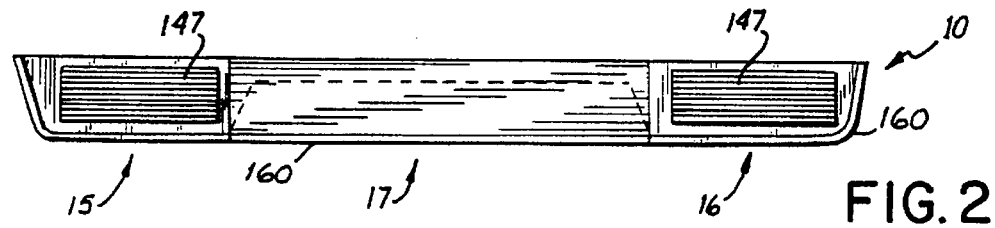
FIG. 2 is a top plan view of the head wall.
Figure 3:
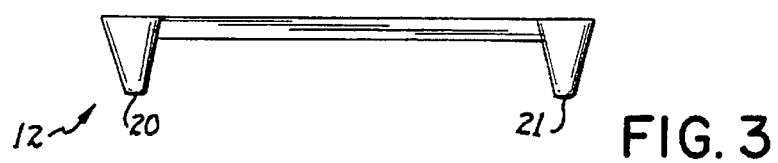
FIG. 3 is a top plan view of the bed locator.
Figure 4:
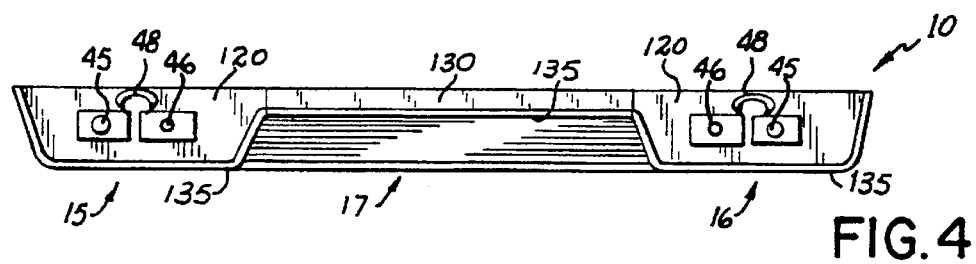
FIG. 4 is a bottom plan view of the head wall.

Indirect lighting fluorescent bulbs are mounted in the top of each module 15 and 16. Fluorescent down light bulbs are mounted in the upper part of the center section to provide reading lights for the patient. As shown in FIGS. 1 and 2, the modules 15 and 16 project from the room wall a distance of about six inches and contain within the space defined by the module electrical outlets, gas outlets, nurse call blood pressure measuring equipment and the like, as will be described below. As indicated by FIG. 1, all of this equipment is concealed by the tambour doors 25 and 26 covering the modules 15 and 16, respectively. The center section 17 contains horizontal raceways, to be described, that are normally covered by a center panel 27 that is adapted to be pivoted out of the way for access to the raceways.

Referring to FIG. 5, the tambour doors 25 and 26 have been slid on tracks into the center section and behind the panel 27. This sliding of the tambour doors exposes the operating elements of the head wall. With this combination, the patient entering the room would see the head wall with tambour doors overlying the modules 15 and 16, as shown in FIG. 1, thereby presenting no medical apparatus to give cause for alarm. When, however, it is necessary to use the equipment, it is immediately accessible simply by sliding the tambour doors 25 and 26 into a concealed position behind the center panel 27, as shown in FIG. 5. When the change is made, the patient probably would not be aware of the change of condition of the room since the head of the bed would be disposed immediately under the head wall 10.

As will appear from the detailed description of the raceways and the compartments in the modules, the head wall is susceptible of a wide variety of different locations of the operating elements on the modules. Thus, the hospital architect has considerable leeway in the matter of designing the positioning of the operating elements to accommodate the customary procedures in the hospital. The arrangement of the elements shown in FIGS. 5 and 6 is thus illustrative only.

In the left module 15, three gas outlets are provided. Outlet 30 is for vacuum, outlet 31 is for oxygen and outlet 32 is for nitrous oxide. The named gases are of course illustrative, the hospital being able to designate the gases it wishes for its application. Below the gas outlets are electrical outlets. The outlet 34 is for 110 volts and outlet 33 normally colored red is connected to the emergency supply.

A molded T-shaped receptacle 38 is mounted in the module 15 to receive blood pressure monitoring equipment. A mercury manometer is shown at 39 and a cuff storage area is shown at 40.

At the lower part of the module 15 is a nurse call unit 42. The nurse call unit can be one of a variety of sizes and shapes. There are some rather large nurse call units that could be required to go in module 16. As will be seen, the module structure is designed to accommodate large or small call units. Each unit has a remote cancel button 43 and a receptacle 44 to receive a remote bed pendant control receptacle. The remote cancel button 43 is provided to enable the nurse to cancel, at bedside, the nurse call. This is preferred rather than having the call cancelled at the central nurse station, for it provides assurance that the patient will in fact have been attended to.

The remote bed pendant control (not shown in drawing) is a control instrument used by the patient for controlling the operation of a number of items such as the bed, television and nurse call.

On the underside of the module is a redundant remote cancel button 45 and a redundant receptacle 46 for the remote bed pendant control jack. By providing elements 45 and 46 on the underside of the module 15, the tambour doors 25, 26 can be closed with those items being fully operational.

The tambour doors may have a cluster of small openings overlying the speaker-microphone portion of the nurse call unit. These are formed by milling off a portion of the strips that form the door, thereby facilitating the passage of sound to and from the speaker microphone.

Module 15 also contains a pivotal hook 47 for receiving an IV solution. The hook can be swung out to an operative position or swung into the module, as shown, so that it can be covered by the tambour door when it is closed.

A bottle slide 48 is pivotally mounted on the lower surface of the module 15 so that it can be swung upwardly to lie in a concealed position against the lower surface of the module, or it can be swung down to a depending position, as shown, where it can be used to receive a vacuum bottle or other container.

The opposite module 16 has gas outlets 30, 31, and 32 identical to the gas outlets on module 15. The module 16 also has electrical outlets 33 and 34, outlet 33 being colored red as an emergency outlet. The lower part of the module 16 is adapted to receive a low voltage nurse call unit. None is shown since, in the illustrated arrangement, the nurse call unit is in module 15. The underside of the module is adapted to receive a remote cancel button 45, a remote bed pendant control receptacle 46 and a bottle slide 48. When a hospital room is designed, the architect will make the decision as to which side of the head wall should contain those elements and which of those elements will simply be duplicated on both sides. The invention provides those options.

An IV hook 47 is mounted in module 16 just as one is mounted in module 15 so that the IV can be administered from either side of the patient.

The bed locator 12 has, in each bumper 20 or 21, four electrical outlet positions 50. These can be used for standard 110 V supply, an emergency 110 V supply, a low voltage supply and a supply specifically designated for the operation of the bed. That supply indicated at 50(A) will normally supply 110 V to the bed motor. That supply is in a circuit with limit switches mounted on the modules as well as the down light, to be described below. The cooperative relationship between the outlet 50(a) and the limit switches is such as to interrupt the power to the bed when the bed or any accessory mounted on the bed strikes any lower portion of the head wall or strikes the down light in the center section 17. One of the bumpers 20 as well as one of the modules 15 and 16 may also have a receptacle for making an optional connection for a nurse call cord.

The construction of the head wall and its mounting on the hospital wall is best shown in FIG. 6. The hospital wall 11 is formed by a plurality of vertical studs 60 that are covered by dry wall 61. Between two of the studs are three tubes 62, 63 and 64 for the three gas supplies. The electrical supply is terminated at three upper outlets: 65 for 110 V emergency, outlet 66 for standard 110 V and outlet 67 for low voltage. The junction boxes 68 for those supplies are mounted in positions corresponding to positions on the center section of the head wall, as will be described.

Directly below the outlets 65, 66 and 67 are junction boxes 69 that contain terminations 70, 71 and 72 (FIG. 1) for the supplies 65, 66 and 67, respectively. These terminations are located behind the bed locator unit 12 and are adapted to be connected to the outlets on the bed locator unit.

A dry wall 61 covers the studs and has openings 73 aligned with the gas tube terminations and junction boxes to provide access to those elements. The head wall 10 is mounted on the room wall 11 overlying the openings 73.

The basic structure of the head wall is sheet metal configurated to form enclosed raceways in the center section and compartments in the modules. The center section has raceways 75, 76, 77 and 78. Raceway 75 contains left and right sets of three tubes 80 connected to the gas outlets 30, 31 and 32. The tubes 80 have, prior to installation, free ends 81 by which they can be connected to the gas terminations 62, 63 and 64, accessible through the opening 73 in the room wall. Raceway 76 has electrical wiring 85 that is connected to the emergency outlets 33. Raceway 77 has wiring 86 similar to the wiring 85 in raceway 76. The wiring 86 is connected to the conventional or standard 110 V outlets 34. Raceway 78 has wiring 87 that is connected to the low voltage system, principally the communication system, that is connected to the receptacle 44 of the nurse call unit 42. The low voltage system is also connected to the receptacle 46 and the remote cancel buttons 43 and 45 described above.

In module 15, there are walls forming a gas compartment 90, the walls including opposed vertical plates 91 and 92 in the front of the module. Those plates have a plurality of pre-drilled holes 93. The gas outlets 30, 31 and 32 are bolted to the plates 91 and 92, as shown in FIG. 6.

The module 15 has walls forming a compartment 94, the walls including front plates 95 and 96. The electrical outlets 33 and 34 are bolted to pre-formed holes in the plates 95 and 96, as shown.

The module 15 also has walls forming a compartment 100 including front plates 101 and 102. A nurse call unit is mounted by bolts to the front plates 101 and 102. The compartment 100 includes a bottom wall 103 having holes 104 and 105. The holes 104 and 105 are adapted to receive the cancel button 45 and the redundant jack 46 for the remote bed pendant control. Module 15 also includes a compartment 110 adapted to receive a molded T-shaped receptacle for the blood pressure unit. The compartment 110 will also receive an aneroid blood pressure unit.

Module 16 is similarly configured to provide an upper compartment 111 for gases, a compartment 112 for emergency electrical wiring and a compartment 113 for standard 110 V wiring and compartment 114 for low voltage wiring. The compartment 114 has a bottom wall 115 with cutouts 116 and 117 to receive remote bed pendant control receptacle 46 and redundant cancel button 45.

Each module has a lower horizontal plate 120 carried by U-shaped brackets 121 (see enlarged insert). The brackets have, at their upper ends, tabs 122 that are connected by bolts 123 to the bottom wall 103 of the module. Each bolt 123 is slidable in a hole 124 in the wall 103 and is loosely secured to the bracket 121 so that the bracket can move upwardly about ¼' inch. Limit switches 125 and 126 (FIG. 5) are carried on each side of the plate 120 and are adapted to be operated when the plate 120 is raised by about ¼ inch. The limit switches are connected to the power supply for the bed so as to interrupt the power supply to the bed when any of the limit switches is operated.

A plate 130 is mounted below the center section 17 and is upwardly movable. The plate 130 is pivotally connected at each end to a plate 120 by means of an elongated bolt 131. If either side of the plate 130 is raised, the plate will in turn raise one side of the plate 120, thereby closing the inboard limit switch 125 or 126 to interrupt the power to the bed. Thus, when the bed is raised, any contact by the bed or accessories mounted on the bed that engage the bottom plates 120 or 130 will prevent any damage to the head wall by interrupting the power to the bed.

Molding formed of wood trim strips 135 is bolted to flanges 136 on the plates 120 and 130 (see FIG. 6).

A lower tambour door track 140 is mounted on the bottom wall of the modules 15, 16 as well as the bottom wall of the center section 17. That track cooperates with a comparable track 141 (FIG. 5) on the top of the modules 15 and 16 as well as the top of the center section 17, thereby completing the support for the tambour door.

The top of each module has upwardly-turned flanges 145 forming an upwardly-facing compartment 146. Each compartment 146 has a socket and fluorescent bulb 148 connected to the 110 V supply. The compartment 146 is covered with a translucent member 147 to provide an indirect lighting fixture above each module.

Horizontal strips 150 form a downwardly-facing compartment 151 at the top of center section 17. The compartment 151 contains a pair of fluorescent bulbs and sockets to provide bed lighting for the patient. The ends of the compartment 151 have horizontal brackets 152 by which the compartment 151 is loosely bolted to L-shaped brackets 153 mounted on the top of each module (see enlarged insert). The bolts 154 that provide the mounting are adapted for vertical movement in the brackets 153 so that the compartment 151 can float vertically about ¼ inch. A limit switch 155 is mounted on each side on each module 15 and 16 adjacent the end of the compartment 151, the limit switch being actuated by the floating bolt 154 that contacts it when the compartment 151 is raised. The limit switches on each side are connected to the bed power outlet so as to interrupt the power to the bed when the limit switch is actuated. Thus, if the compartment 151 is struck by the bed or accessory, the power to the bed will be cut off. Upper molding (wood trim) 160 is secured to the forwardly-facing surface of the module compartments 146 and the compartment 151 to attractively conceal the metal work behind the moldings as well as the trackways for the tambour doors.

Each module is covered by a respective fascia plate 165, the fascia plate having cutouts tailored to the respective size, number and positioning of the gas outlets, electrical outlets and nurse control box.

The raceways 75–78 have a sheet metal cover 167 mounted to them. Overlying the cover 167 is the decorative panel 27 that is hinged to the compartment structure 151.

The panel overlies the raceways 75–78 in the center section 17 so that the tambour doors can be slid behind the panel when the modules are opened up for access. The panel preferably is pivoted to one of the modules for horizontal swinging motion to open up the raceways. The panel of course may be plain; it could have a decorative scene painted on it, or it could have a backing and frame combination permitting the insertion of selected artwork.

In the operation of the invention, the head wall and bed locator are mounted on a wall above a bed as shown in FIG. 1. When a patient is installed in the hospital room, the tambour doors 25, 26 are preferably closed so that the patient has the feeling that he is in that type of comfortably appointed room for patients that have only a minor illness. All of the equipment to attend a much more critically ill patient is more immediately available behind the tambour doors. Should the need arise to use that equipment, it is immediately accessible simply by opening one or both tambour doors. Furthermore, outlets are available on either side of the bed to provide flexibility for the care of the patient.

Representative dimensions for the head wall are depicted in FIGS. 1 and 2. Beginning with the stated dimension of 48 inches between modules, the depicted length is about 98 inches, the height is about 31 inches and the depth that the modules project from the walls is about 10 inches.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof.

We claim:

1. A combination of a headwall unit mounted on a wall above a patient bed in a hospital room comprising:

two horizontally-spaced modules mounted on and projecting outwardly from said wall and defining a recessed area therebetween, each said module containing a plurality of medical service outlets including oxygen, vacuum and electrical outlets, said modules being spaced apart a sufficient distance so as to dispose one of said modules on each side of said bed, a removable panel mounted between said modules across said recessed area, and an opaque door mounted across each said module and movable between an open position in which said service outlets are exposed and accessible for use and a closed position in which said service outlets are concealed from view to provide a more visually pleasing environment;

said headwall unit having an extrememost lower edge, said extrememost lower edge being located above said bed.

2. A combination of a headwall unit mounted on a wall above a patient bed in a hospital room comprising:

two horizontally-spaced modules mounted on and projecting outwardly from said wall and defining a recessed area therebetween, each said module containing a plurality of medical service outlets including oxygen, vacuum and electrical outlets, a removable panel mounted between said modules across said recessed area, and an opaque door mounted across each said module and movable between an open position in which said service outlets are exposed and accessible for use and a closed position in which said service outlets are concealed from view to provide a more visually pleasing environment;

said headwall unit having a length to height ratio of at least about 3 to 1;

said headwall unit having an extrememost lower edge, said extrememost lower edge being located above said bed.

3. A combination of a headwall unit mounted on a wall above a patient bed in a hospital room comprising:

two horizontally-spaced modules mounted on and projecting outwardly from said wall and defining a recessed area therebetween, each said module containing a plurality of medical service outlets including oxygen, vacuum and electrical outlets, said modules being spaced up to about four feet apart, a removable panel mounted between said modules across said recessed area, and an opaque door mounted across each said module and movable between an open position in which said service outlets are exposed and accessible for use and a closed position in which said service outlets are concealed from view to provide a more visually pleasing environment;

said headwall unit having an extrememost lower edge, said extrememost lower edge being located above said bed.

* * * * *